(12) United States Patent
MacNamara et al.

(10) Patent No.: US 10,540,196 B2
(45) Date of Patent: Jan. 21, 2020

(54) TECHNIQUES TO ENABLE LIVE MIGRATION OF VIRTUAL ENVIRONMENTS

(71) Applicant: INTEL CORPORATION, Santa Clara, CA (US)

(72) Inventors: Chris MacNamara, Limerick (IE); John J. Browne, Limerick (IE)

(73) Assignee: INTEL CORPORATION, Santa Clara, CA (US)

(*) Notice: Subject to any disclaimer, the term of this patent is extended or adjusted under 35 U.S.C. 154(b) by 33 days.

(21) Appl. No.: 15/201,094

(22) Filed: Jul. 1, 2016

(65) Prior Publication Data

US 2018/0006896 A1    Jan. 4, 2018

(51) Int. Cl.
*H04L 29/08* (2006.01)
*G06F 15/173* (2006.01)
*G06F 9/455* (2018.01)
*G06F 3/06* (2006.01)
*H04L 29/06* (2006.01)

(52) U.S. Cl.
CPC .......... *G06F 9/45558* (2013.01); *G06F 3/067* (2013.01); *G06F 3/0617* (2013.01); *G06F 3/0647* (2013.01); *H04L 67/145* (2013.01); *H04L 69/16* (2013.01); *G06F 3/0664* (2013.01); *G06F 2009/4557* (2013.01); *G06F 2009/45595* (2013.01)

(58) Field of Classification Search
CPC ... G06F 3/0647; G06F 3/0617; G06F 9/45558
USPC ..... 718/1, 104, 105; 709/224, 226, 227, 228
See application file for complete search history.

(56) References Cited

U.S. PATENT DOCUMENTS

| | | | |
|---|---|---|---|
| 8,027,354 B1* | 9/2011 | Portolani | H04L 49/70 370/395.2 |
| 10,089,124 B2* | 10/2018 | Barlev | G06F 9/4555 |
| 2007/0094659 A1* | 4/2007 | Singh | G06F 9/45533 718/1 |
| 2007/0271560 A1* | 11/2007 | Wahlert | G06F 8/61 718/1 |
| 2011/0131654 A1* | 6/2011 | Taneja | H04L 63/1416 726/23 |
| 2015/0355982 A1* | 12/2015 | Ganesan | G06F 11/2023 714/4.11 |
| 2016/0309369 A1* | 10/2016 | Roeland | H04W 36/0011 |

OTHER PUBLICATIONS

"VMWare vCenter Server Heartneat 5.5"—VMWare, Inc., Mar. 5, 2009 https://www.vmware.com/pdf/heartbeat_55_reference_guide.pdf (Year: 2009).*

* cited by examiner

*Primary Examiner* — Randy A Scott

(57) ABSTRACT

Embodiments may be generally directed to techniques to receive an indication to perform a migration of a virtual environment and services from a first host system to a second host system, initiate the migration of the virtual environment and services by communicating information associated with the virtual environment and services from the first host system to a second host system, and communicate a data structure having a value to a peer system, the value set to cause the peer system to halt communication of information for the virtual environment to the first host system.

20 Claims, 12 Drawing Sheets

TECHNIQUES TO ENABLE LIVE MIGRATION OF VIRTUAL ENVIRONMENTS

TECHNICAL FIELD

Embodiments described herein generally relate to performing migration of live virtual environments utilizing lossless transfers.

BACKGROUND

The utilization of virtual environments to provide services and capabilities is becoming more and more prevalent in today's computing environment. Virtual environments are being used to provide services with high availability and traffic latency requirements. For example, telecommunication companies are using these environments to provide telecom services to users. Systems that provide these services are constantly monitored to ensure that the services are being provided and meet the stringent requirements stipulated by the customers. In some instances, when a virtual environment is not meeting these requirements, the virtual environment may be migrated from one device to another device. This "live" migration must occur in a seamless manner to ensure that a user does not experience performance degradations.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
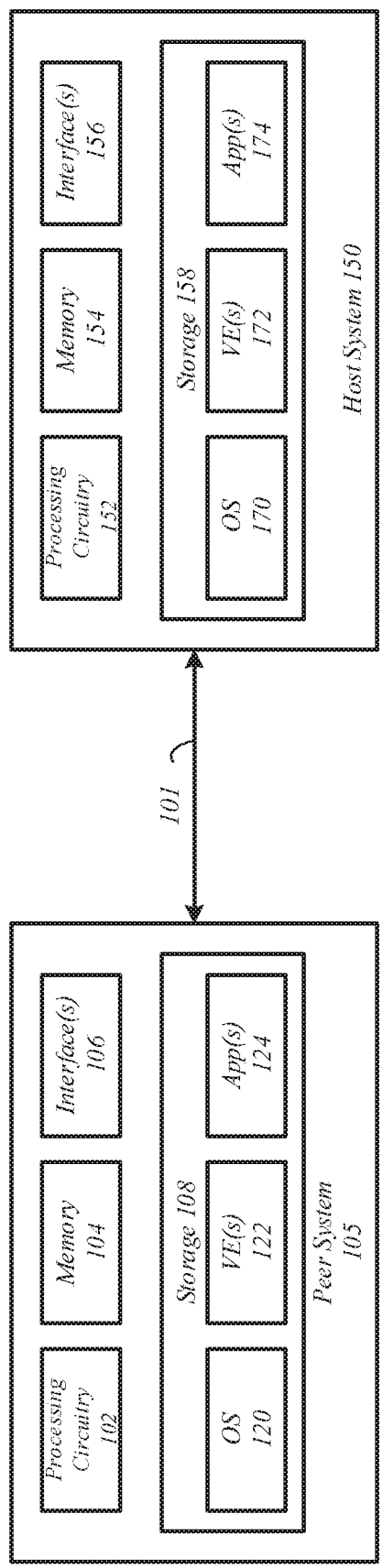
FIG. 1 illustrates an example of a first system.

Various embodiments discussed herein may include methods, apparatuses, devices, and systems to perform a live migration of a virtual environment. The live migration of the virtual environment may be performed such that little or no downtime is experienced by a user of the system while maintaining a single session for the virtual environment.

Some embodiments include a peer system communicating information with a host system. The host system may provide a virtual environment for the peer system to process data and information, for example. Thus, the peer system may communicate information to the host system for processing and the host system may communicate results back to the peer system. For any number of reasons, as will be discussed in more detail below, a migration of the virtual environment may occur from the host system to another host system.

In some embodiments, the source host system, e.g. the host system currently providing the virtual environment, may receive an indication to perform the migration of a virtual environment and services. The indication may be based on a user interaction or computer generated. The source host system may initiate the migration of the virtual environment and services by communicating information associated with the virtual environment and services from source host system to the target host system. The information may be related to the virtual environment including information for processing by the virtual environment, settings for the virtual environment, and state information. Further, the source host system may cause the peer system to pause or halt sending information by communicating a data structure having a value set to the peer system. For example, the source host system may communicate an acknowledgement packet having a window credit or size set to a zero value. Upon receiving the packet, the peer system may halt sending information to the source host system.

The target host system, in response to receiving the indication of the migration, may initiate one or more processes for the virtual environment and service in preparation of the migration. The target hot system may also receive the information associated with the virtual environment and services and perform any configurations required. Once the virtual environment is established on the target host system, the target host system may communicate a data structure having a value to a peer system. More specifically, the value may be set to cause the peer system to commence communication of information for the virtual environment to the second host system. These and further details will be discussed herein.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a general overview of a compute system 100 including a peer system 105 and a host system 150 coupled by a link 101. In embodiments, the system 100 Systems depicted in some of the figures may be provided in various configurations. In some embodiments, the systems may be configured as a distributed system where one or more components of the system are distributed across one or more networks in a cloud computing system. Further, the systems may utilize virtual environments. Thus, one or more components of the systems may not necessarily be tied to a particular machine or device, but may operate on a pool or grouping of machines or devices having available resources to meet particular performance requirements, for example. System 100 may enable one or more virtual environments to be migrated from one system to another system due to a number of factors such as not meeting one or more service level requirements. These and other details will become more apparent in the following description.

Peer system 105 may include a number of components including, but not limited to processing circuitry 102, memory 104, one or more interfaces 106, and storage 108. In some embodiments, the processing circuitry 102 may include logic and may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuitry 102 may be connected to and communicate with the other elements of the peer system 105 via interconnects (now shown), such as one or more buses, control lines, and data lines. In some embodiments, the processing circuitry 102 may include processor registers or a small amount of storage available the processing units to store information including instructions that and can be accessed during execution. Moreover, processor registers are normally at the top of the memory hierarchy, and provide the fastest way to access data.

As mentioned, the peer system 105 may include memory 104 to store information. Further, memory 104 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 104 can store data momentarily, temporarily, or permanently. The memory 104 stores instructions and data for peer system 105. The memory 104 may also store temporary variables or other intermediate information while the processing circuitry 102 is executing instructions. In some embodiments, information and data may be loaded from memory 104 into the computing registers during processing of instructions. Manipulated data is then often stored back in memory 104, either by the same instruction or a subsequent one. The memory 104 is not limited to storing the above discussed data; the memory 104 may store any type of data.

The one or more interfaces 106 includes any device and circuitry for processing information or communications over wireless and wired connections. For example, the one or more interfaces 106 may include a receiver, a transmitter, one or more antennas, and one or more Ethernet connections. The specific design and implementation of the one or more interfaces 106 may be dependent upon the communications network in which the peer system 105 is intended to operate.

In various embodiments, the one or more interfaces 106 may include one or more I/O controllers (not shown) to output any signals and information. The I/O controller may enable communication over wireless and wired connections. In various embodiments, the I/O controller may be separate component or module.

The peer system 105 may include storage 108 which may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 108 may include technology to increase the storage performance enhanced protection for valuable digital media when multiple hard drives are included, for example. Further examples of storage 108 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Further, the storage 108 may include instructions that may cause information to be temporarily stored in memory 104 and processed by processing circuitry 102. More specifically, the storage 108 may include one or more operating systems (OS) 120, one or more virtual environments 122, and one or more applications 124.

In embodiments, the one or more operating systems 120, may be any type of operating system such as Android® based on operating system, Apple iOS® based operating system, Symbian® based operating system, Blackberry OS® based operating system, Windows OS® based operating system, Palm OS® based operating system, and so forth. The operating system 120 may enable other virtual environments 122 and applications 124 to operate.

In some embodiments, the peer system 105 may include one or more virtual environments 122 which may include one or more virtual machines that operate via a virtual machine manager, such as Hypervisor®. These virtual machines may emulate particular parts of a computer system, such as hardware, memory, and interfaces, and software including an operating system. Virtual machines operate based on the computer architecture and functions of a real or hypothetical computer. Embodiments are not limited in this manner and in some instances, the virtual environments 122 may be a container that differs from virtual machines in that they utilize a common operating system and share hardware resources including the memory and interfaces. A container typically does not require a virtual machine manager to operate; and therefore, in certain situations, provide better performance than virtual machines. Moreover, other virtual environments may be utilized and be consistent with embodiments described herein.

The peer system 105 may include any number of applications 124 include games, content applications, media applications, functionality and utility applications, social networking applications, business and productivity applications, lifestyle applications, and communication applications. In some instances, these applications 124 may be utilize and operate in a particular virtual environment 122 of the peer system 105. In addition, the virtual environments 122 and applications 124 may use cloud based computing to store and process information. For example and as will be discussed in more detail below, the peer system 105 may utilize a host system 150 to process information in a virtual environment 172.

The host system 150 may include any number of devices, components, and so forth to provide cloud-based computing services. These cloud-based computing services may include on-demand services that a peer device 105 may utilize to perform processing and storage tasks. These services include scalable, virtual environments 172 which may be implemented on a dedicated or private server(s), for example. The host system 150 may also create and provide a virtual private cloud that may implement the virtual environment. For example, the host system 150 may include a server farm to provide processing capabilities for a peer system 105. The host system 150 can include devices, such as computing devices, storage devices, networking devices, database devices, and so forth.

In the illustrated example, the host system 150 includes processing circuitry 152, memory 154, one or more interfaces 156, and storage 158. These components may be the same as or similar to the liked name components discussed above with respect to the peer system 105. Further, the storage 158 may include one or more operating systems 170, virtual environments 172, and applications 174. As previously mentioned, the virtual environments 172 can provide the one or more services for the peer system 105, to process information, for example. The virtual environments 172 may include virtual machines including a virtual machine manager, such as Hypervisor®. In the same or instances, the virtual environments 172 may include containers, such as Docker® to provide a virtual environment for the peer system 105.

In some instances, the virtual environments 172 can include and/or utilize virtual network functions (VNFs) which takes on the responsibility of handling specific network functions that run on one or more virtual machines, for example, on top of the hardware networking infrastructure—routers, switches, etc. Individual VNFs can be connected or combined together as building blocks to offer a full-scale networking communication services for the peer system 105.

As will be discussed in more detail below, the host system 150 may provide the aforementioned services and functions in accordance with service level agreements and peer system requirements to process information. These requirements, which may be specified or based on a service level agreement, may include a minimum availability, performance (maximum response times and processing time), security (encryption), disaster recovery, location of data, access to data, portability of data, and so forth. Thus, embodiment are directed to ensuring agreements and requirements are being met while providing the services. For example, embodiments may include migrating a virtual environment and services from a source host system to a target host system when the source host system is incapable of providing the services at level required by a service level agreement and specified requirements. The migration may include switching a link between the source host system and the target host system while maintaining a single session for the peer system 105, which may be a SCTP session or a TCP session. These and other details will become more apparent in the following description.

Figure 2A:
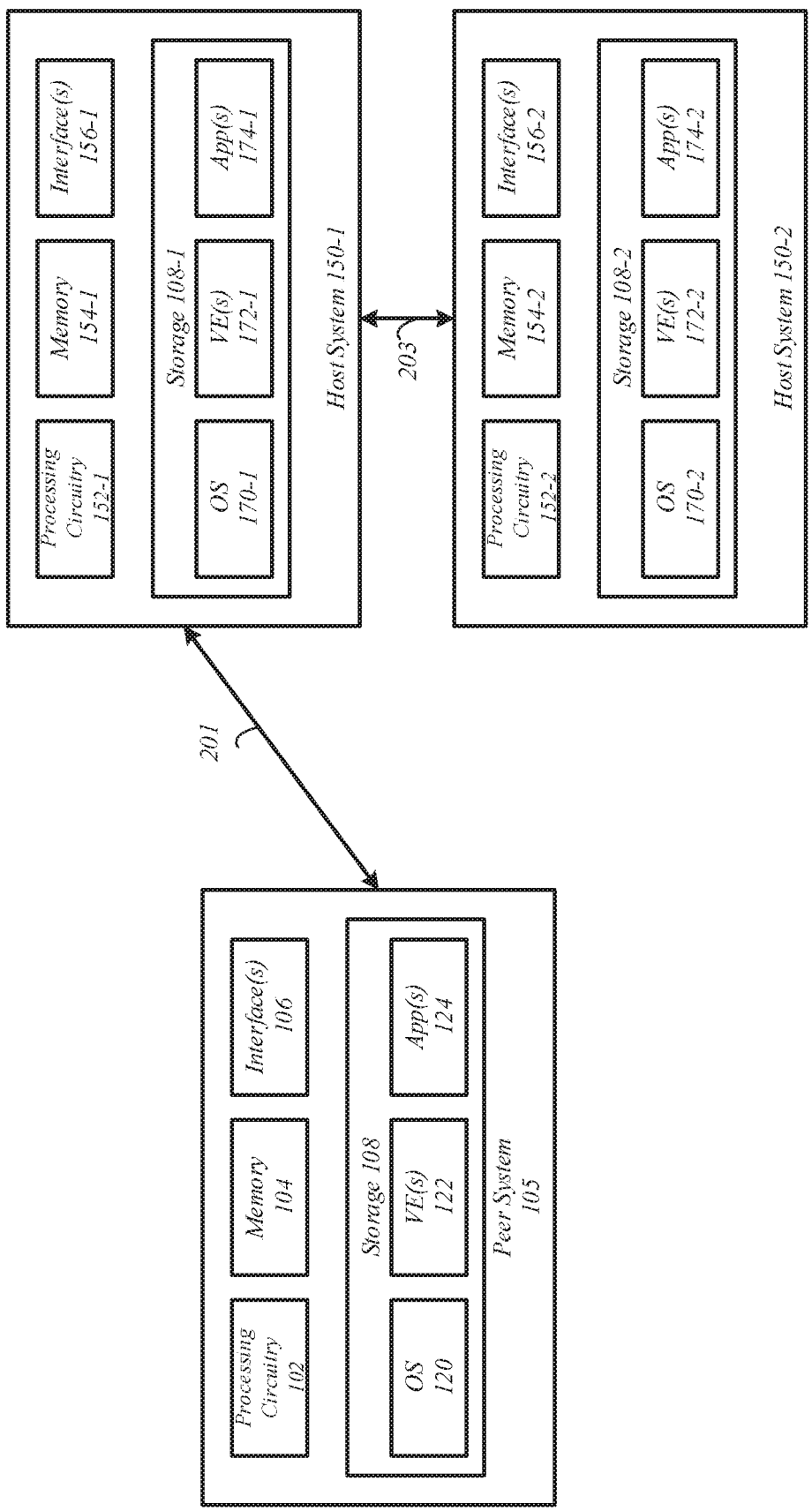
FIGS. 2A/2B illustrate examples of a second system.

FIGS. 2A/2B illustrate an example system 200 having a peer system 105, a first host system 150-1, and a second host system 150-2. The first and second host systems 150-1 and 150-2 may be similar to or the same as host system 150 discussed above in FIG. 1. In the illustrated example in FIG. 2A, the peer system 105 may be coupled with the first host system 150-1 via a link 201. The link 201 includes any combination of wired and wireless connections and may communicate information and data via any number of protocols, such as TCP and SCTP. Note that embodiments not limited to these example protocols, in some instances other protocols may be utilized such as the Internet Key Exchange Protocol Version 2 (IKEv2) Mobility, Multihoming Protocol (MOBIKE), SCTP, MultiPath TCP (MP-TCP), Internet Protocol version 6 (IPv6), and so forth.

The peer system 105 may communicate information with the first host system 150 utilizing the link 201 in accordance with one or more of these protocols. More specifically, the peer system 105 may communicate information to the first host system 150 for processing as one or more packets and chunks in accordance with the protocols. The information may include any type of data that may be processed by the first host system 150-1. For example, the data may include instructions that may be processed or cause processing by the first host system 150-1 or data for storage by the first host system 150-1. Each packet or chunk may include a particular amount of information based on the protocol for example.

In some instances, the peer system 105 may receive an acknowledgement in response to transmitting information. More specifically, the first host system 150-1 may communicate an acknowledge packet indicating that a packet, group of packets, chunk, or group of chunks were properly received by the first host system 150-1 that were sent by the peer system 105. Further, the acknowledgement packet can include other information, such as a window credit or window size value specifying to the peer system 105 a maximum amount of data that can be transferred in the next communication of information. In current operations, the value can also be set to zero when communications are congested at the host system 150 to cause the peer system 105 not to communicate information. Moreover, by setting the window credit or window size to zero for congestion control, the peer system 105 may not communicate information to a host system 150, but may maintain a session over the link and communicate a heartbeat, the link remains up with no useful data flowing between peers.

This feature may be used by embodiments discussed herein to enable a transfer or migration of a virtual environment between host systems while maintaining the single connection with the peer system 105. Further, the transfer or migration may occur in manner such that packets are not dropped and data is not lost. Note that setting window credit or window size value to zero is not to be used as congestion control in embodiments discussed herein, but is being used enable a migration of virtual environment between host systems 150.

In one example, the peer system 105 may communicate information to the host system 150-1. In response to receiving the information, the first host system 150-1 may send and the peer system 105 may receive a selective acknowledgement (SACK) packet having a window credit or window size value indicating a maximum amount of information that can be sent in the next communication based on available information in a buffer. Typically, the value is zero or a non-zero integer value indicating a number of bytes that can be transmitted. The peer system 105 may communicate with the host system 150-1 and receive non-zero integer values for any period of time when the service level agreement and requirements are being meet for a particular session. However, if a service level agreement and requirements are not being met for the virtual environment, the virtual environment may be switched from the first host system 150-1 to a second host system 150-2. In some instances, the switch may be caused by a user or administrator of the system 200. The switch may also be caused by the first and/or second host system 150-1 and 150-2 monitoring parameters of the system 200. If one or more of the parameters indicates that the first host system 150-1 is not meeting the service level agreement and requirements for a specified amount of time a switchover may occur, for example. Embodiments are not limited in this manner and the switchover may occur for other reasons. For example, a system administrator element or management system may cause a switchover during periods of low load to achieve operation expense savings. These systems may need to provide high availability, e.g. 99.999% or greater availability during the switchover.

Figure 2B:
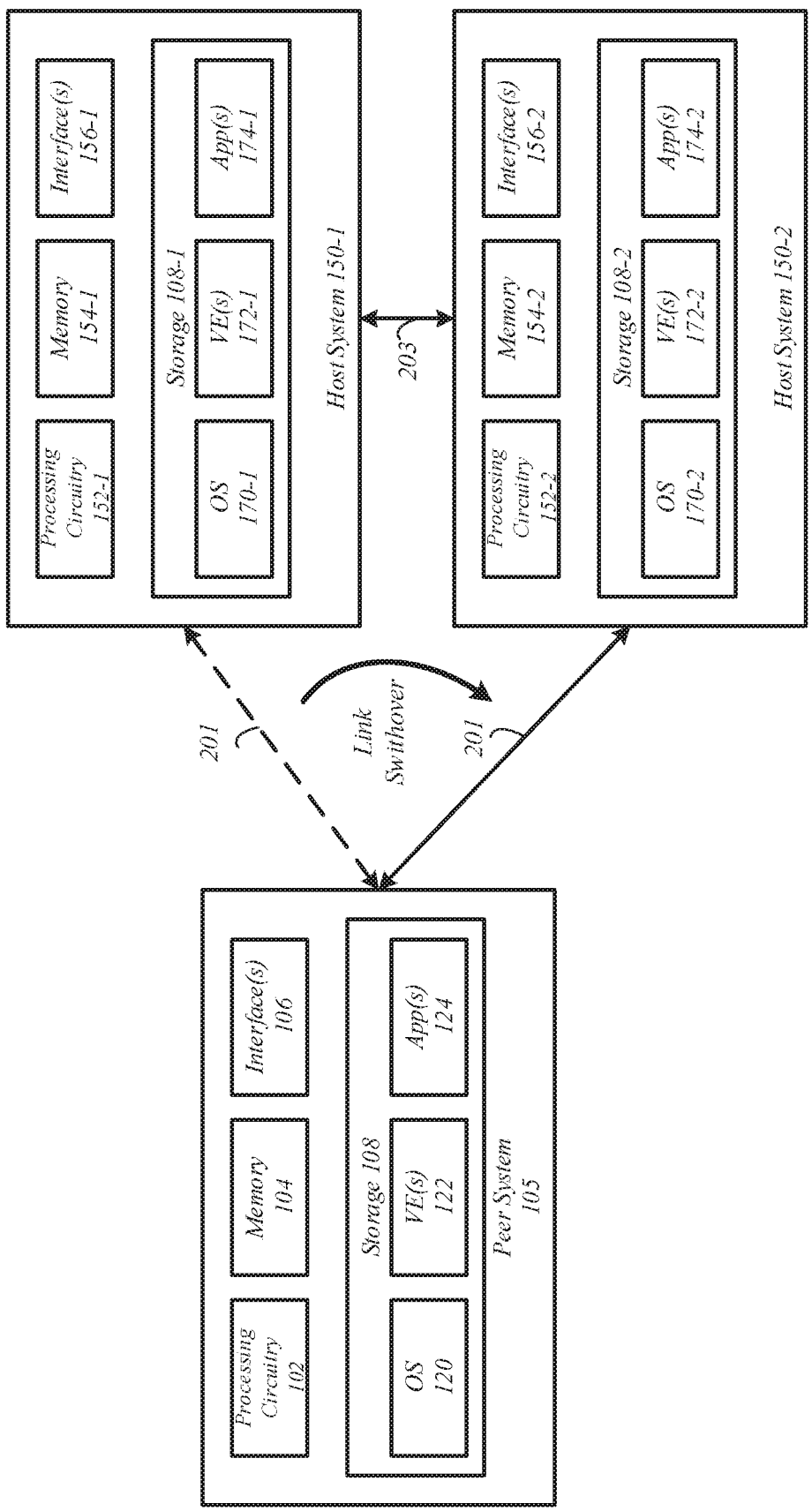

FIG. 2B illustrates system 200 after a switchover of link 201 and a virtual environment from the first host system 150-1 to the second host system 150-2 during a single session for the peer system 105. For example, embodiments may include initiating a migration of the virtual environment on the first host system 150-1 to the second host system 150-2. As previously mentioned, the migration may be caused by a user, element management system, the first host system 150-1, the second host system 150-2, or another device and based on a service level agreement and/or one or more requirements not being meet.

In embodiments, the first host system 150-1 may communicate information to the second host system 150-2 via link 203 based on the initiation of the migration. The link 203 may be any wired or wireless link and operate in accordance with any protocol. The information may indicate to the second host system 150-2 that a migration is to occur. Further, additional information may be communicated from the first host system 150-1 to the second host system 150-2 including compressed or uncompressed dirty memory pages, which may include peer system 105 information that is buffered to cache, but not committed to disk or memory. The compressed or uncompressed dirty memory pages are communicated to ensure that no information from the peer system 105 is lost during the migration.

The first host system 150-1 also closes the SCTP or TCP window for the peer system 105 by setting the window credit or window size value in an acknowledgement packet to zero. Thus, the peer system 105 will cease in sending information to the first host system 150-1. However, the link 201 to the first host system 150-1 will remain open until the switchover actually occurs. Further, a heartbeat may be communicated between the peer system 105 and the first host system 150-1 during this time. In some cases the heartbeat interval timer may be extended to allow for longer periods to ensure the SCTP link stays up during the migration.

The first host system 150-1 also stops and/or pauses one or more processes associated with the virtual environment being migrated. These processes may be associated with an operating system for the virtual environment, any application processes for the peer system 105, and so forth. Embodiments are not limited in this manner. The first host system 150-1 transfers any remaining information to the second host 150-2. This information may include state information for the virtual environment and remaining dirty page information. Post migration of the critical data, the first host system 150-1 then frees any compression cache once the remaining dirty page information is communicated to the second host system 150-2.

The second host system 150-2 may start the virtual environment for the peer system 105 in a paused state and receive the dirty page information and state information from the first host system 150-1. The migration of information from the first host system 150-1 to the second host system 150-2 may be complete. The second host system 150-2 may start or un-pause the virtual environment on the second host system 150-2. This may include starting any processes that are required by the peer system 105 for operation and utilization of the virtual environment.

The second system 150-2 may cause a multi-home switchover of the link 201 from the first host system 150-1 to the second host system 150-2 to maintain a single session with the peer system 105. For example, the link destination may be switched from the first system 150-1 to the second system 150-2 for a multi-home switchover. The second host system 150-2 may open the SCTP or TCP window with the peer system 150-2 by communicating an acknowledgement packet having a window credit or window size value set to a non-zero value. The non-zero value can be an indication of the maximum amount of data that can be communicated in the communication from the peer system 105 to the second host system 150-2. In embodiments, the migration of a virtual environment between host systems 150 may be seamless to a peer system 105 or client, and requires no modification to existing transport protocols and to the peer system 105. Further, embodiments described herein may be advantageous over previous migration solutions because the link is maintained. Whereas previous migration solutions requires the link to be reset or shutdown and the re-established. Thus, the previous migration solutions may be slow and/or result in packet loss and/or connection loss.

Figure 3:
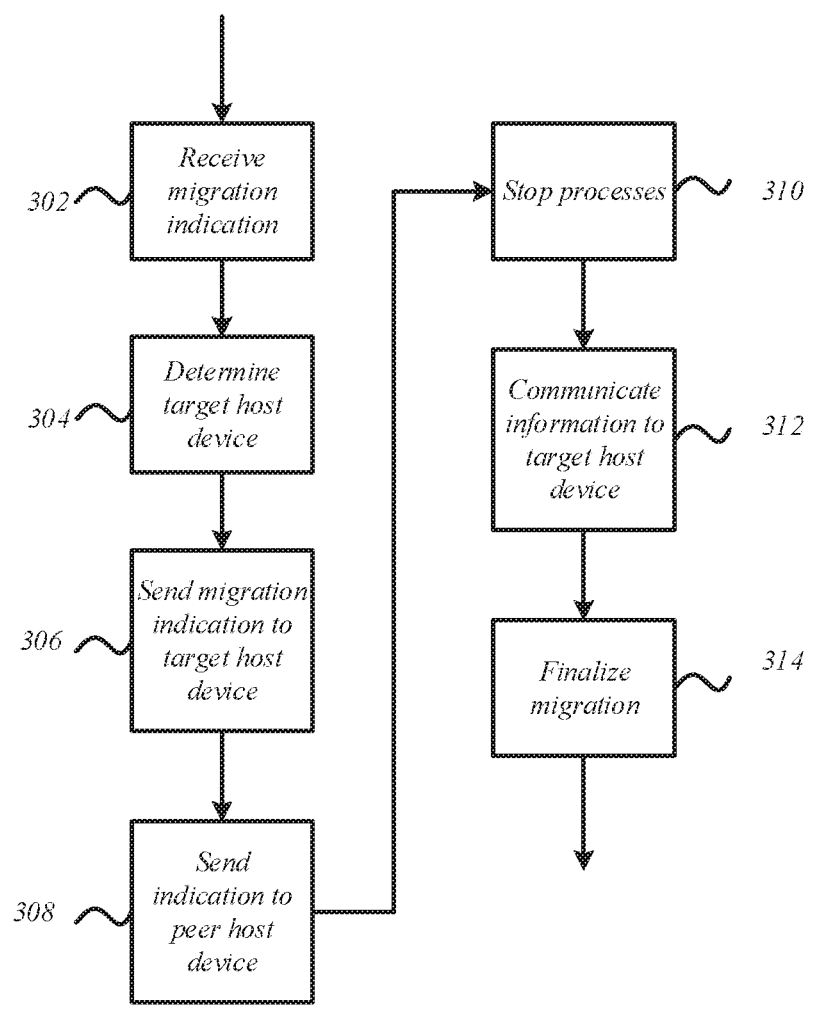
FIG. 3 illustrates an example of a first logic flow.

FIG. 3 illustrates an example of a first logic flow 300 for performing a migration of a virtual environment. The logic flow 300 may be representative of some or all of the operations executed by one or more embodiments described herein. For example, the logic flow 300 may illustrate operations performed by a source host system illustrated in FIGS. 1, 2A, and 2B. Various embodiments are not limited in this manner.

At block 302, embodiments may include receiving an indication to perform a migration of a virtual environment for a peer system. For example, a source host system may receive an indication to perform a migration of a virtual environment from the source host system to a target host system based on a user input or a detection that one or more requirements are not being met for a service level agreement. Note that the source host system may be the same as the first host system 150-1 and the target host system may be the same as the second host system 150-2 previously discussed.

At block 304, the source host system may determine a target host system to receive the virtual environment and information associated therewith. In some instances, the determination may be based on information received in the indication to perform the migration. For example, the target host system may be provided by a user input. In another example, the source host system may make the determination based on available target host systems, and capabilities of those systems. More specifically, the source host system may select the target host system based on whether the target host system can meet the requirements of the service level agreement.

In some embodiments, the source host system may communicate information to indicate to the target host system that a migration is to occur. Further, additional information may be communicated from the source host system to the target host system including compressed or uncompressed dirty memory pages, which may include a client or peer system's information that is buffered to cache, but not committed to disk or memory. The compressed dirty memory pages are communicated to ensure that no information from a peer system is lost during the migration.

At block 308, the source host system may send an indication over a link to a peer system, the indication to close an SCTP or TCP window for the link between the source host system and the peer system. The peer system may cease sending information and data to the source host system, but the link may remain up and a heartbeat may be communicated by the peer system to the source host system. Thus, the peer system may not close a session with the source host system during the migration of the virtual environment.

At block 310, the source host system stops one or more processes for the virtual environment. These processes may be operating system processes, system processes, hardware associated processes, and application processes for the virtual environment. Embodiments are not so limited and other processes may be stopped by the source host system to migrate the virtual environment.

In some embodiments, the logic flow 300 may include communicating information to the target host system at block 312. The information can include the remaining dirty page information and state information for the virtual environment. Other information to finalize the migration may be communicated between the source host system and the target host system. Embodiments are not limited in this manner.

At block 314, the source host system may finalize the migration of the virtual environment. For example, the source host system may stop any remaining processes required for the virtual environment and free compression cache used for communicating information with the peer system. Embodiments are not limited in this manner and other actions may be performed to finalize the migration of virtual system.

Figure 4:
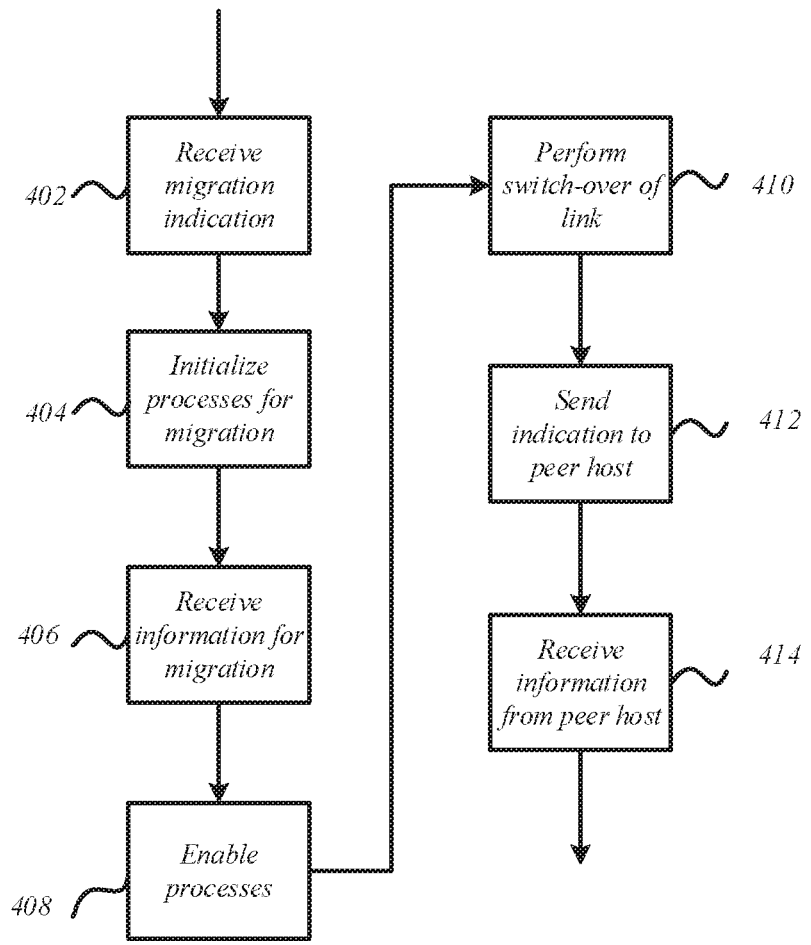
FIG. 4 illustrates an example of a second logic flow.

FIG. 4 illustrates an example of a second logic flow 400 for performing a migration of a virtual environment. The logic flow 400 may be representative of some or all of the operations executed by one or more embodiments described herein. For example, the logic flow 400 may illustrate operations performed by a target host system, e.g. second host system 150-2, illustrated in FIGS. 2A and 2B. Various embodiments are not limited in this manner.

At block 402, the target host system may receive an indication of a migration of virtual environment. The indication may be received from a source host system and may include information in all of the memory pages of the source system associated with the virtual environment while the virtual environment is operating on the source host system. The source host system may also send information from one or more dirty pages of memory related to the virtual environment and a peer system. At block 404, the target host system may initiate one or more processes associated with the virtual environment to prepare for the migration of the virtual environment. The one or more processes can include operating system processes, applications processes, system processes, hardware processes, and so forth. In some instances, the one or more processes may be initiated in a target host state. Further and at block 406, the target host system may receive additional information including any remaining dirty page information and state information for the virtual environment. Embodiments are not limited in this manner and other information may be received by the target host system.

At block 408, the target host system may enable the one or more processes for the virtual environment. As previously discussed, the one or more processes can include operating system processes, applications processes, system processes, hardware processes, and so forth. The target host system may enable the processes by causing the processes to change from a paused state to an enable state. At block 410, the target host system may perform a switchover of the link. In some embodiments, the switchover is a multihoming switchover. For example, SCTP supports multihoming which enables more than one network path in the same association, e.g. the name of a session used in SCTP for a connection between hosts, such as the source host system and the target host system. Thus, a single session may be maintained when a link is switched from the source host system to the target host system.

At block 412, the target host system may send an indication to the peer system to enable communication to the target host system. For example, the target host system may communicate an acknowledgement or selective acknowledgement with a window credit or window size value set to a non-zero integer value. The peer system may communicate information to the target host system based on the non-zero integer value set in the packet at block 414. Further, the peer system may also communicate a heartbeat with the target host system once the multihoming switchover. In embodiments, the peer system may continue to communicate information to the target host system until the session ends or another migration occurs. Embodiments are not limited in this manner.

Figure 5:
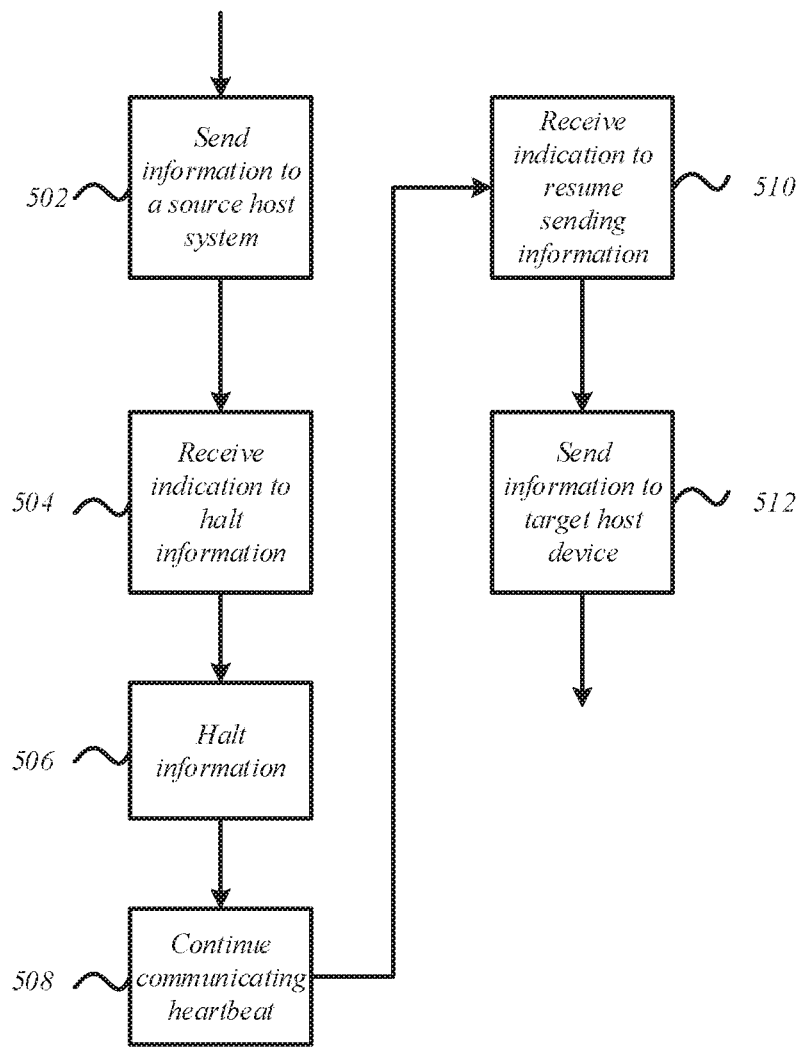
FIG. 5 illustrates an example of a third logic flow.

FIG. 5 illustrates an example of a third logic flow 500 for performing a migration of a virtual environment. The logic flow 500 may be representative of some or all of the operations executed by one or more embodiments described herein. For example, the logic flow 500 may illustrate operations performed by a peer system, e.g. peer system 105, illustrated in FIGS. 1, 2A, and 2B. Various embodiments are not limited in this manner.

At block 502, a peer system may communicate information to a source host system. The information may be any type of information for processing by the source host system. The amount of information communicated may be based on a non-integer value specified in a window credit or window size of an acknowledgement packet. In embodiments, the peer system may continue to communicate information to the source host system until it receives an indication to halt sending information, e.g. receive an acknowledgement packet with a window credit or window size set to zero. More specifically and at block 504, the peer system may receive a packet indicating to the peer system to halt sending information to a source host system. As previously mentioned, the packet may be an acknowledgement or selective acknowledgement packet having a window credit or window size value set to zero.

At block 506, the peer system may halt sending information to the source host system. However, the peer system may maintain a link and a session with the source host system during this time when information is not be sent. In addition, the peer system may communicate a heartbeat or link keep alive message to the source host system at block 508. The heartbeat may be used to ensure that the source host system is still there and to cause the peer system to maintain the link and the session. If the heartbeat does not indicate the source host system is "alive," the peer system may close the link and the session and reestablish them with a different host system.

AT block 510, the peer system receive an indication to communicate information to a host system. The indication may be received from a target host system in an acknowledgement or selective acknowledgement packet having a window credit or window size value set to a non-zero integer value. The target host system may have received information and provide a virtual environment for the peer system after a migration from the source host system. At block 512, the peer system may send information to the target host system for processing. Note that the link may have been switched from the source host system to the target host system for the peer system. Further, a single session may be maintained for the peer system during the migration of the virtual environment. Embodiments are not limited in this manner.

Figure 6A:
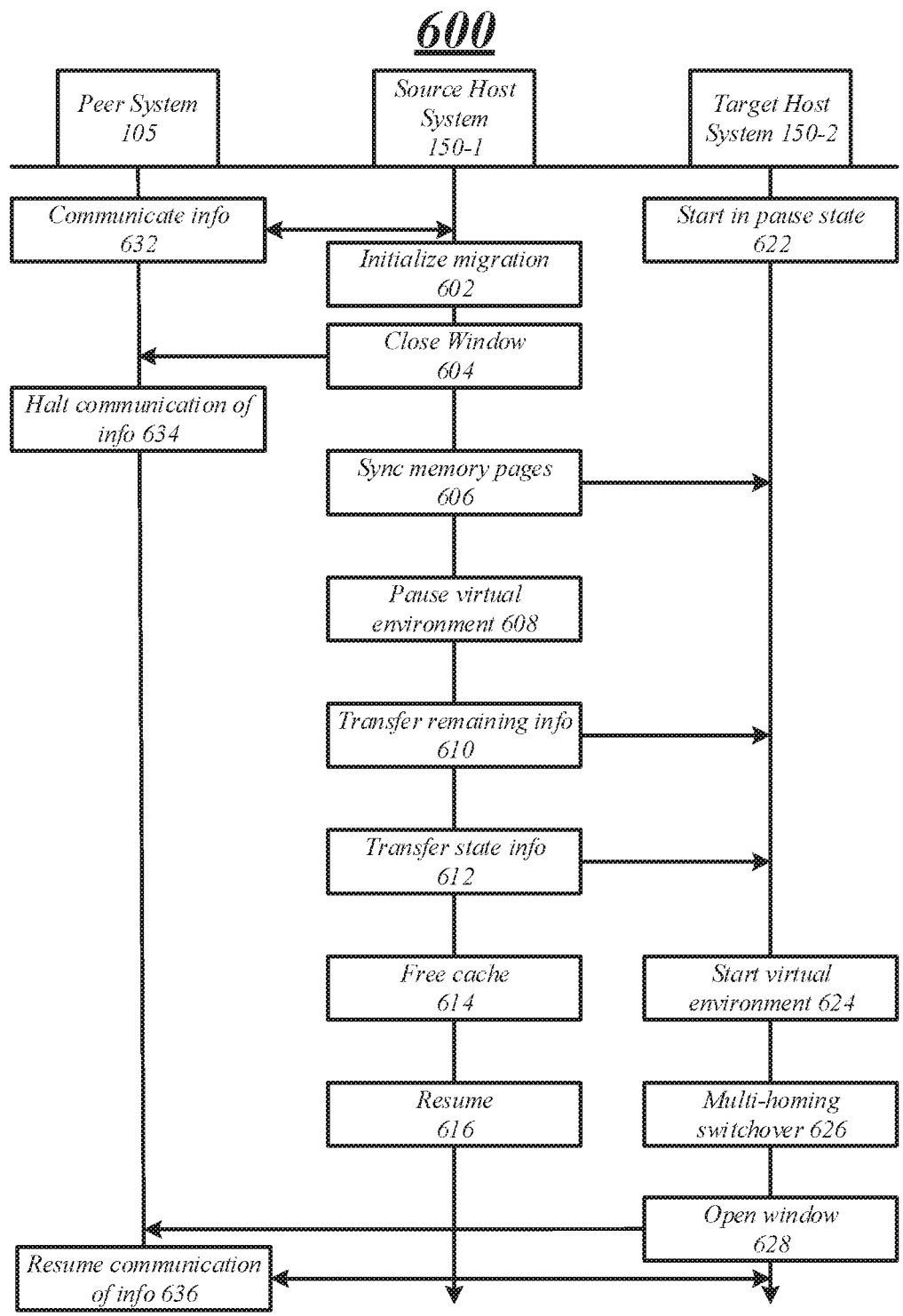
FIG. 6A illustrates an example of a processing flow diagram.

FIG. 6A illustrates an example of a first processing flow 600 to perform a migration of a virtual environment. In the illustrated example, the processing flow 600 includes a peer system 105, a source host system 150-1, and a target host system 150-2. In embodiments, the peer system 105 may communicate information with the source host system 150-1 at block 632. Information may be communicated between peer system 105 and the source host system 150-1 for an amount of time and until the peer system 105 receives an indication to halt communicating information.

At block 602, the source host system 150-1 may initialize a migration of a virtual environment to the target host system 150-2. For example, the source host system 150-1 may allocate compression cache, enable dirty page logging for memory for the virtual environment, and set all the memory pages to dirty. Further, at block 622, the target host system may start in a paused state. Note that starting in the pause state is not contingent on the initialization of the migration.

At block 604, the source host system 150-1 may close a window to communicate for the peer system 105. As previously discussed, the source host system 150-1 may send an acknowledgement packet, such as a SACK packet, setting a window size or window credit to zero to close a SCTP or TCP window. At block 634, the peer system 105 may cease sending information and data to the source host system 105-1, but the link may remain up and a heartbeat may be communicated by the peer system 105 to the source host system 150-1.

At block 606, the source host system 150-1 may sync compressed and uncompressed dirty memory pages with the target host system 150-2. The memory pages may include information for the virtual environment cached based on the initialization of the migration. At block 608, the source host system 150-1 may pause the virtual environment. For example, the source host system 150-1 may cause one or more processes associated with the virtual environment to cease operation. Embodiments are not limited in this manner.

At block 610, the source host system 150-1 may transfer or communicate any remaining information to the target host system 150-2. The information includes compressed and uncompressed dirty page information and any other information may be required by the target host system 150-2 to start the virtual environment. At block 612, the source host system 150-1 may transfer state information to the target host system 150-2. The source host system 150-1 may finalize the migration on itself by freeing cache at block 614 and resuming operations at block 616.

At block 624, the target host system 150-2 initializes or starts the virtual environment based on the information received from the source host system 150-1. Further and at block 626, the target host system 150-2 may perform a multi-homing switchover to switchover an end point of a link to the target host system 150-2 such that the peer system 105 communicates with the target host system 150-2. At block 628, the target host system 150-2 may open a window for communication with peer system 105. More specifically, the target host system 150-2 may communicate an acknowledgement with a window credit or size set to a non-zero value. At block 636, the peer system 105 may communicate information with the target host system 150-2.

Figure 6B:
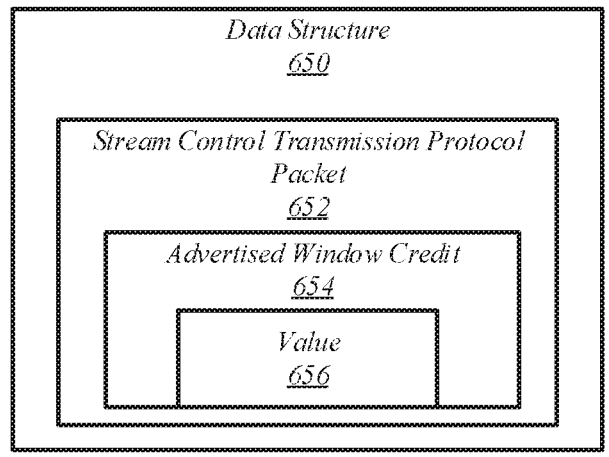
FIGS. 6B/6C illustrate examples of data structures.

FIG. 6B illustrates an example data structure 650 for use in performing a migration of a virtual environment. The data structure 650 may include a SCTP packet 652 having an advertised window credit 654 having an integer value 656. The integer value 656 may be set to zero to cause a receiving system to halt sending information. Further, the integer value 656 may be set to a non-zero value to indicate to the receiving system to send an amount of information based on the non-zero value. More specifically, the non-zero value may indicate an amount of space available in a buffer.

Figure 6C:
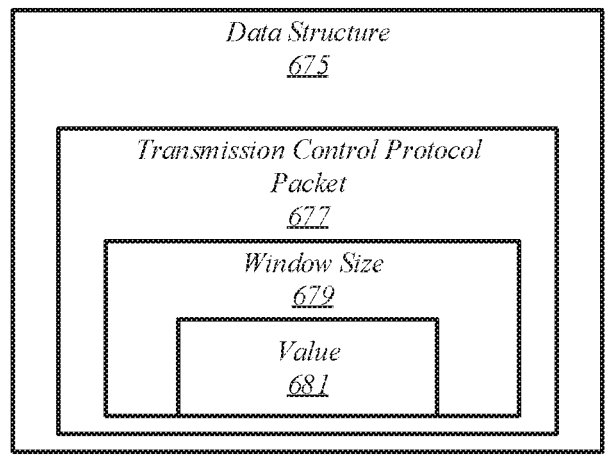

FIG. 6C illustrates an example data structure 675 also for use in performing a migration of a virtual environment. The data structure 675 includes a TCP packet 677 having a window size 679 which may be set with a value 681. As similarly discussed above in FIG. 6C, the value may be set to a zero to cause a system to halt sending information and a non-zero value to indicate an amount of information to communicate.

In embodiments, data structure 650 and 675 can be used during a migration of a virtual environment. For example, a host system receiving information, but failing to meet a service level agreement and/or requirements may cause a migration of a virtual environment. The host system may send a peer system using the virtual environment data structure 650 or data structure 675 in response to receiving information and to cause the peer system to halt sending information. The peer system may halt sending information and the host system may cause a migration of the virtual environment to another host system. The data structure 650 or data structure 675 may be sent to the peer system once the migration is complete and the peer system may send information to the other host system. Embodiments are not limited in this manner.

Figure 7A:
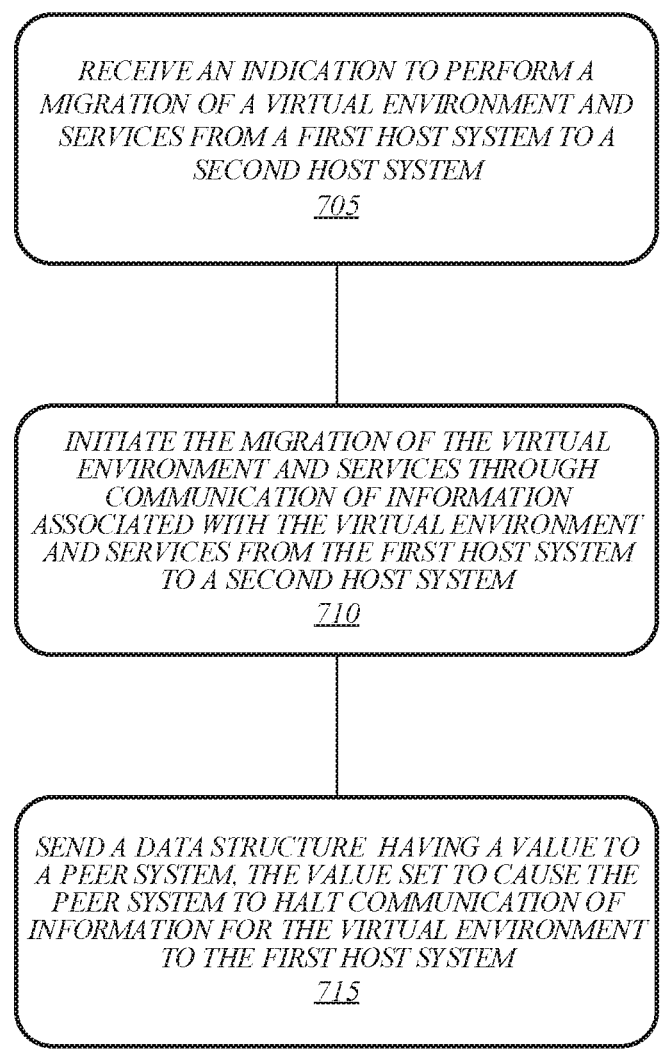
FIGS. 7A/7B illustrate examples of logic flows.

FIG. 7A illustrates an embodiment of a fourth logic flow diagram 700. The logic flow 700 may be representative of some or all of the operations executed by one or more embodiments described herein. For example, the logic flow 700 may illustrate operations performed by one or more systems or devices in FIGS. 1-6C. Various embodiments are not limited in this manner.

In various embodiments, logic flow 700 may include receiving an indication to perform a migration of a virtual environment and services from a first host system to a second host system at block 705. The indication may have been user generated or computer generated based on the first host system failing to meet requirements based on a service level agreement. Further and at block 710 the logic flow 700 may include initiating the migration of the virtual environment and services through communication of information associated with the virtual environment and services from the first host system to a second host system. The information may include an indication of the migration and information in dirty page files for a peer system. The logic flow 700 also includes sending a data structure having a value to a peer system, the value set to cause the peer system to halt communication of information for the virtual environment to the first host system at block 715. The data structure may be a SCTP or TCP SACK packet including a window credit or window size set to zero. The peer system may receive the data structure and halt sending information to the first host system.

Figure 7B:
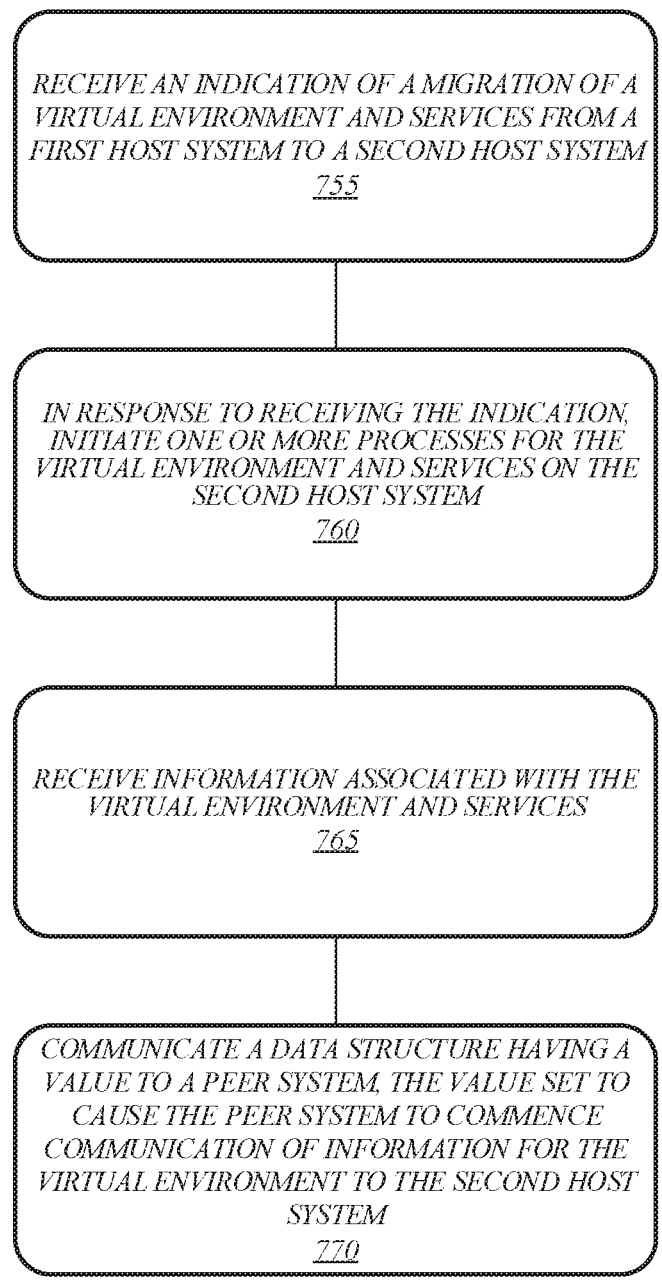

FIG. 7B illustrates an embodiment of a fifth logic flow diagram 750. The logic flow 750 may be representative of some or all of the operations executed by one or more embodiments described herein. For example, the logic flow 750 may illustrate operations performed by one or more systems or devices in FIGS. 1-6B. Various embodiments are not limited in this manner.

In embodiments, the logic flow 750 includes receive an indication of a migration of a virtual environment and services from a first host system to a second host system at block 755. The indication may be received by the second host system and from the first host system. Further and at block 760, the logic flow includes in response to receiving the indication, initiating one or more processes for the virtual environment and services on the second host system. The one or more processes may include operating system processes, application process, and any other process associated with and/or required by the virtual environment.

The logic flow 750 may include receiving information associated with the virtual environment and services at block 765. The information may include dirty page information and state information for the virtual environment. At block 770, the logic flow includes communicating a data structure having a value to a peer system, the value set to cause the peer system to commence communication of information for the virtual environment to the second host system. The data structure may be a SCTP or TCP SACK packet include a window credit or window size value set to a non-zero value indicating an amount of information a peer system can send to the second host system. Embodiments are not limited in this manner.

Figure 8:
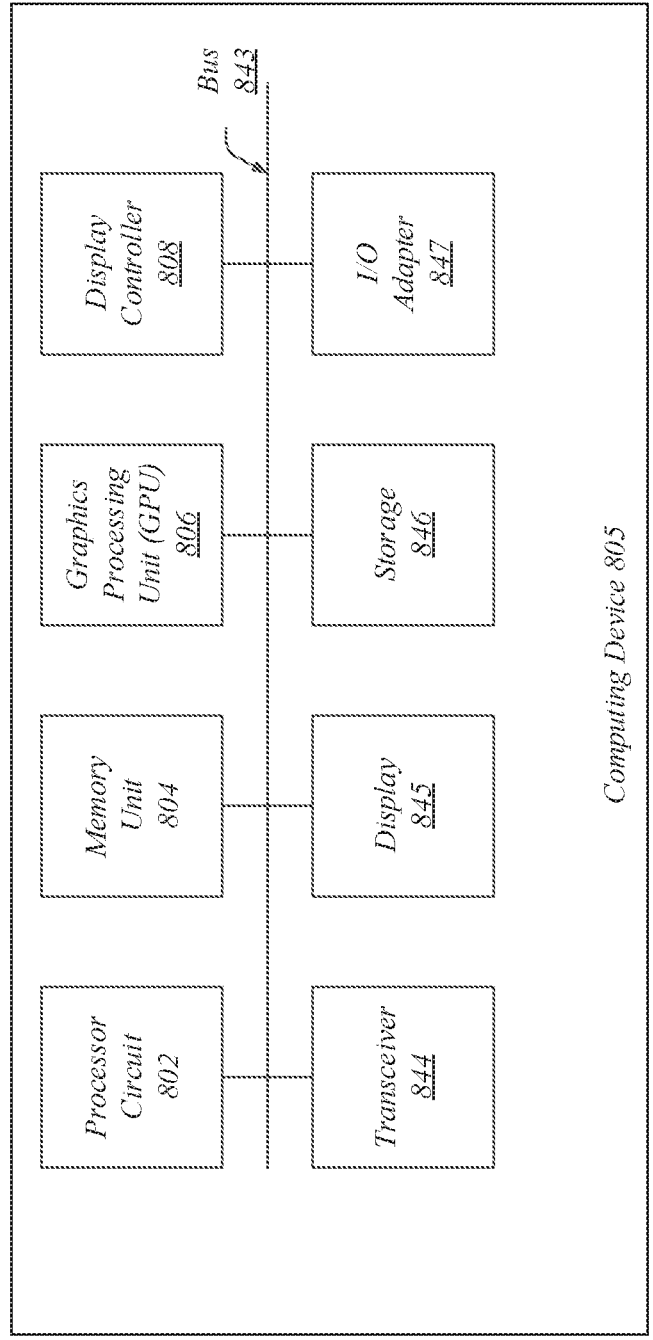
FIG. 8 illustrates an example of a computing system.

FIG. 8 illustrates one embodiment of a system 800. In various embodiments, system 800 may be representative of a system or architecture suitable for use with one or more embodiments described herein, such as computing system 100 and 200. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a computing device 805 which may be any type of computer or processing device including a personal computer, desktop computer, tablet computer, netbook computer, notebook computer, laptop computer, server, server farm, blade server, or any other type of server, and so forth.

In various embodiments, computing device 805 may include processor circuit 802. Processor circuit 802 may be implemented using any processor or logic device. The processing circuit 802 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 802 may be connected to and communicate with the other elements of the computing system via an interconnect 843, such as one or more buses, control lines, and data lines.

In one embodiment, computing device 805 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory. In some embodiments, the machine-readable or computer-readable medium may include a non-transitory medium. The embodiments are not limited in this context. In some embodiments, memory 104 and 154 may be the same as memory unit 804.

Computing device 805 may include a graphics processing unit (GPU) 806, in various embodiments. The GPU 806 may include any processing unit, logic or circuitry optimized to perform graphics-related operations as well as the video decoder engines and the frame correlation engines. The GPU 806 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 806 may process any type of graphics data such as pictures, videos, programs, animation, 3D, 2D, objects images and so forth.

In some embodiments, computing device 805 may include a display controller 808. Display controller 808 may be any type of processor, controller, circuit, logic, and so forth for processing graphics information and displaying the graphics information. The display controller 808 may receive or retrieve graphics information from one or more buffers. After processing the information, the display controller 808 may send the graphics information to a display.

In various embodiments, system 800 may include a transceiver 844. Transceiver 844 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. It may also include a transceiver for wired networking which may include (but are not limited to) Ethernet, Packet Optical Networks, (data center) network fabric, etc. In communicating across such networks, transceiver 844 may operate in accordance with one or more applicable standards in any version. The embodiments are not limited in this context.

In various embodiments, computing device 805 may include a display 845. Display 845 may constitute any display device capable of displaying information received from processor circuit 802, graphics processing unit 806 and display controller 808.

In various embodiments, computing device 805 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 805 may include one or more I/O adapters 847. Examples of I/O adapters 847 may include Universal Serial Bus (USB) ports/adapters, IEEE 1394 Firewire ports/adapters, and so forth. The embodiments are not limited in this context.

Figure 9:
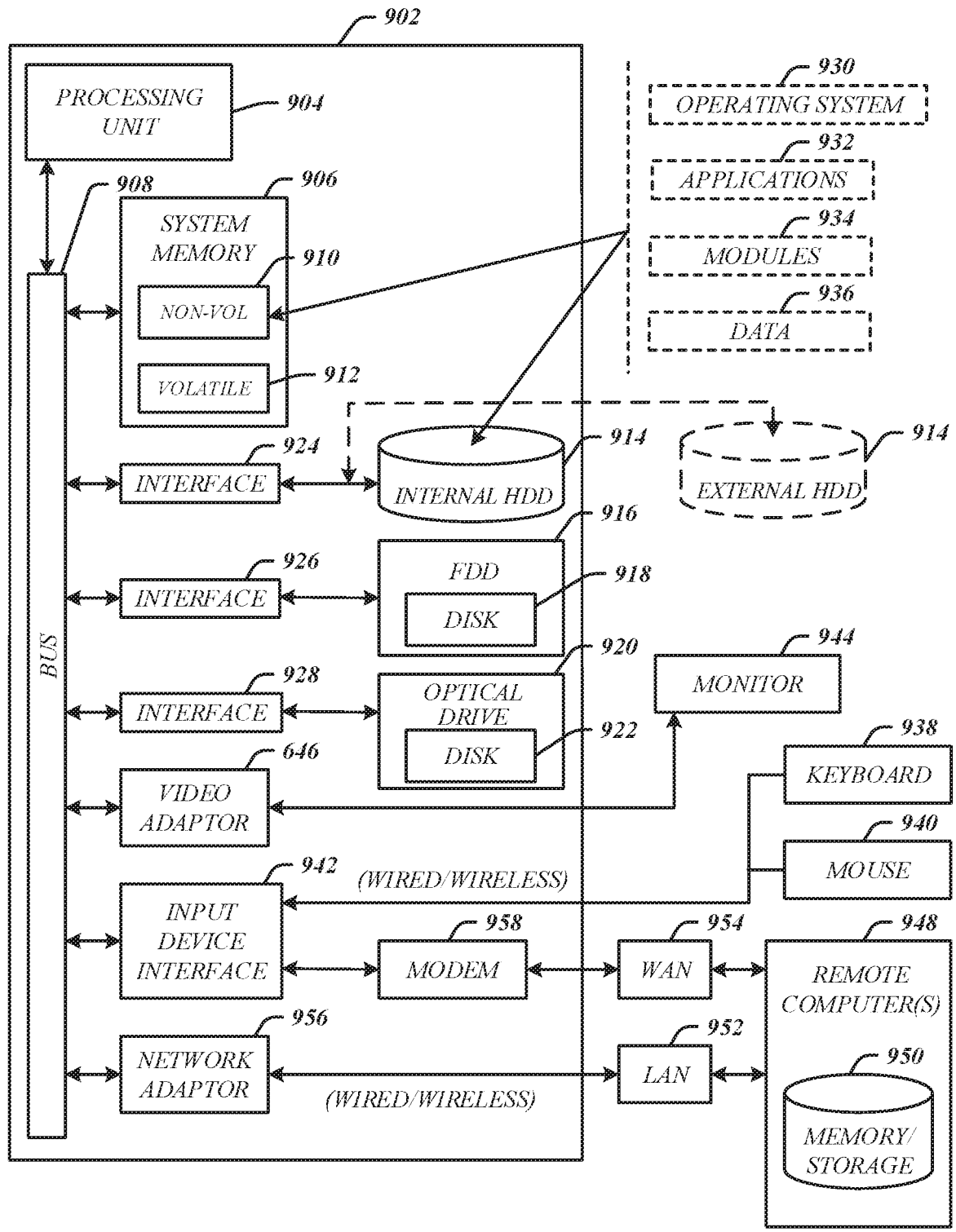
FIG. 9 illustrates an example of a computer architecture.

FIG. 9 illustrates an embodiment of an exemplary computing architecture 900 suitable for implementing various embodiments as previously described. In one embodiment, the computing architecture 900 may comprise or be implemented as part of systems 100 and 200.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, such as those described with reference to the processing circuitry 102 shown in FIG. 1.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 105.

A user can enter commands and information into the computer 902 through one or more wired/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computing system 101 and 200 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three (1-33) provided below are intended to be exemplary and non-limiting.

In a first example, a system, device, apparatus may include memory, processing circuitry coupled with the memory, and logic, at least partially implemented by the processing circuitry, the logic to receive an indication to perform a migration of a virtual environment and services from a first host system to a second host system, initiate the migration of the virtual environment and services through communication of information associated with the virtual environment and services from the first host system to a second host system, and send a data structure having a value to a peer system, the value set to cause the peer system to halt communication of information for the virtual environment to the first host system.

In a second example and in furtherance of the first example, a system, device, apparatus may include the logic to stop one or more processes associated with the virtual environment and services and transfer information associated with the virtual environment and services from the first host system to the second host system.

In a third example and in furtherance of any previous example, a system, device, apparatus may include a data structure comprising a Stream Control Transmission Protocol (SCTP) selective acknowledgement (SACK) packet having an Advertised Window Credit with the value set to zero.

In a fourth example and in furtherance of any previous example, a system, device, apparatus may include the data structure comprising a Transmission Control Protocol (TCP) selective acknowledgement (SACK) packet comprising a Window Size with the value set to zero.

In a fifth example and in furtherance of any previous example, a system, device, apparatus may include the logic to migrate the virtual environment from the first host system to the second host system while maintaining a single session for the virtual environment and the peer system.

In a sixth example and in furtherance of any previous example, a system, device, apparatus may include the logic to maintain a heartbeat between the first host system and the peer system during the migration of the virtual environment and services.

In a seventh example and in furtherance of any previous example, a computer-readable storage medium comprising a plurality of instructions that, when executed by processing circuitry, enable processing circuitry to receive an indication to perform a migration of a virtual environment and services from a first host system to a second host system, initiate the migration of the virtual environment and services through communication of information from the first host system to a second host system, and send a data structure having a value to a peer system, the value set to cause the peer system to halt communication of information for the virtual environment to the first host system.

In an eighth example and in furtherance of any previous example, a computer-readable storage medium comprising a plurality of instructions that, when executed by processing circuitry, enable processing circuitry to stop one or more processes associated with the virtual environment and services and transfer information associated with the virtual environment and services from the first host system to the second host system to perform the migration.

In a ninth example and in furtherance of any previous example, a computer-readable storage medium comprising a plurality of instructions that, when executed by processing circuitry, enable processing circuitry to processing the data structure comprising a Stream Control Transmission Protocol (SCTP) selective acknowledgement (SACK) packet having an Advertised Window Credit with the value set to zero.

In a tenth example and in furtherance of any previous example, a computer-readable storage medium comprising a plurality of instructions that, when executed by processing circuitry, enable processing circuitry to process the data structure comprising a Stream Control Transmission Protocol (SCTP) selective acknowledgement (SACK) packet having an Advertised Window Credit with the value set to zero.

In an eleventh example and in furtherance of any previous example, a computer-readable storage medium comprising a plurality of instructions that, when executed by processing circuitry, enable processing circuitry to migrate the virtual environment from the first host system to the second host system while maintaining a single session for the virtual environment and the peer system.

In a twelfth example and in furtherance of any previous example, a computer-readable storage medium comprising a plurality of instructions that, when executed by processing circuitry, enable processing circuitry to maintain a heartbeat between the first host system and the peer system during the migration of the virtual environment and services.

In a thirteenth example and in furtherance of any previous example, a computer implemented method may include receiving an indication to perform a migration of a virtual environment and services from a first host system to a second host system, initiating the migration of the virtual environment and services through communication of information associated with the virtual environment and services from the first host system to a second host system, and sending a data structure having a value to a peer system, the value set to cause the peer system to halt communication of information for the virtual environment to the first host system.

In a fourteenth example and in furtherance of any previous example, a computer implemented method may include stopping one or more processes associated with the virtual environment and services, and transferring information associated with the virtual environment and services from the first host system to the second host system.

In a fifteenth example and in furtherance of any previous example, a computer implemented method may include processing the data structure comprising a Stream Control Transmission Protocol (SCTP) selective acknowledgement (SACK) packet having an Advertised Window Credit with the value set to zero.

In a sixteenth example and in furtherance of any previous example, a computer implemented method may include processing the data structure comprising a Transmission Control Protocol (TCP) selective acknowledgement (SACK) packet comprising a Window Size with the value set to zero.

In a seventeenth example and in furtherance of any previous example, a computer implemented method may include migrating the virtual environment from the first host system to the second host system while maintaining a single session for the virtual environment and the peer system.

In an eighteenth example and in furtherance of any previous example, a computer implemented method may include maintaining a heartbeat between the first host system and the peer system during the migration of the virtual environment and services.

In a nineteenth example and in furtherance of any previous example, a system, device, apparatus may include memory, processing circuitry coupled with the memory, and logic, at least partially implemented by the processing circuitry. The logic to receive an indication of a migration of a virtual environment and services from a first host system to a second host system, in response to receiving the indication, initiate one or more processes for the virtual environment and services on the second host system, receive information associated with the virtual environment and services, and send a data structure having a value to a peer system, the value set to cause the peer system to commence communication of information for the virtual environment to the second host system.

In a twentieth example and in furtherance of any previous example, a system, device, apparatus may include the data structure comprising a Stream Control Transmission Protocol (SCTP) selective acknowledgement (SACK) packet comprising an Advertised Window Credit with the value set to a non-zero value.

In a twenty-first example and in furtherance of any previous example, a system, device, apparatus may include the data structure comprising a Transmission Control Protocol (TCP) selective acknowledgement (SACK) packet comprising a Window Size with the value set to a non-zero value.

In a twenty-second example and in furtherance of any previous example, a system, device, apparatus may include the logic to migrate the virtual environment from the first host system to the second host system while maintaining a single session for the virtual environment and the peer system.

In a twenty-third example and in furtherance of any previous example, a system, device, apparatus may include the logic to perform a switch over of a link from the first host system to the second host system, the switch over to maintain the single session for the peer system and the virtual environment.

In a twenty-third example and in furtherance of any previous example, a computer-readable storage medium comprising a plurality of instructions that, when executed by processing circuitry, enable processing circuitry to receive an indication of a migration of a virtual environment and services from a first host system to a second host system, in response to receiving the indication, initiate one or more processes for the virtual environment and services on the second host system, receive information associated with the virtual environment and services, and send a data structure having a value to a peer system, the value set to cause the peer system to commence communication of information for the virtual environment to the second host system. In a twenty-fourth example and in furtherance of any previous example, a computer-readable storage medium comprising a plurality of instructions that, when executed by processing circuitry, enable processing circuitry to process the data structure comprising a Stream Control Transmission Protocol (SCTP) selective acknowledgement (SACK) packet comprising an Advertised Window Credit with the value set to a non-zero value.

In a twenty-fifth example and in furtherance of any previous example, a computer-readable storage medium comprising a plurality of instructions that, when executed by processing circuitry, enable processing circuitry to process the data structure comprising a Transmission Control Protocol (TCP) selective acknowledgement (SACK) packet comprising a Window Size with the value set to a non-zero value.

In a twenty-sixth example and in furtherance of any previous example, a computer-readable storage medium comprising a plurality of instructions that, when executed by processing circuitry, enable processing circuitry to migrate the virtual environment from the first host system to the second host system while maintaining a single session for the virtual environment and the peer system.

In a twenty-seventh example and in furtherance of any previous example, a computer-readable storage medium comprising a plurality of instructions that, when executed by processing circuitry, enable processing circuitry to perform a switch over of a link from the first host system to the second host system, the switch over to maintain the single session for the peer system and the virtual environment.

In a twenty-eighth example and in furtherance of any previous example, a computer-implemented method includes receiving an indication of a migration of a virtual environment and services from a first host system to a second host system, in response to receiving the indication, initiating one or more processes for the virtual environment and services on the second host system, receiving information associated with the virtual environment and services, and sending a data structure having a value to a peer system, the value set to cause the peer system to commence communication of information for the virtual environment to the second host system.

In a twenty-ninth example and in furtherance of any previous example, a computer-implemented method includes processing the data structure comprising a Stream Control Transmission Protocol (SCTP) selective acknowledgement (SACK) packet comprising an Advertised Window Credit with the value set to a non-zero value.

In a thirtieth example and in furtherance of any previous example, a computer-implemented method includes processing the data structure comprising a Transmission Control Protocol (TCP) selective acknowledgement (SACK) packet comprising a Window Size with the value set to a non-zero value.

In a thirty-first example and in furtherance of any previous example, a computer-implemented method includes migrating the virtual environment from the first host system to the second host system while maintaining a single session for the virtual environment and the peer system.

In a thirty-second example and in furtherance of any previous example, a computer-implemented method includes performing a switch over of a link from the first host system to the second host system, the switch over to maintain the single session for the peer system and the virtual environment.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory;
   processing circuitry coupled with the memory, at least a portion of at least one of the memory or processing circuitry comprised in hardware;
   logic, at least partially implemented by the processing circuitry, the logic to:
      receive an indication to perform a migration of a virtual environment and services from a first host system to a second host system;
      initiate the migration of the virtual environment and services through communication of information associated with the virtual environment and services from the first host system to the second host system;
      generate a data structure having a data structure value;
      set the data structure value equal to a value to cause a peer system to halt communication with the first host system;
      halt communication of information for the virtual environment from the peer system to the first host system via sending the data structure to the peer system; and
      maintain a heartbeat between the first host system and the peer system during halting of the communication of information occurring during migration of the virtual environment and services.

2. The apparatus of claim 1, the logic to stop one or more processes associated with the virtual environment and services and transfer information associated with the virtual environment and services from the first host system to the second host system.

3. The apparatus of claim 1, the data structure comprising a Stream Control Transmission Protocol (SCTP) selective acknowledgement (SACK) packet having an Advertised Window Credit with the value set to zero.

4. The apparatus of claim 1, the data structure comprising a Transmission Control Protocol (TCP) selective acknowledgement (SACK) packet comprising a Window Size with the value set to zero.

5. The apparatus of claim 1, the logic to migrate the virtual environment from the first host system to the second host system while maintaining a single session for the virtual environment and the peer system.

6. A non-transitory computer-readable storage medium comprising a plurality of instructions that, when executed by processing circuitry, enable processing circuitry to:
receive an indication to perform a migration of a virtual environment and services from a first host system to a second host system;
initiate the migration of the virtual environment and services through communication of information from the first host system to the second host system;
generate a data structure having a data structure value;
set the data structure value equal to a value to cause a peer system to halt communication with the first host system;
halt communication of information for the virtual environment from the peer system to the first host system via sending the data structure to the peer system; and
maintain a heartbeat between the first host system and the peer system during halting of the communication of information occurring during migration of the virtual environment and services.

7. The non-transitory computer-readable storage medium of claim 6, comprising a plurality of instructions, that when executed, enable processing circuitry to stop one or more processes associated with the virtual environment and services and transfer information associated with the virtual environment and services from the first host system to the second host system to perform the migration.

8. The non-transitory computer-readable storage medium of claim 6, the data structure comprising a Stream Control Transmission Protocol (SCTP) selective acknowledgement (SACK) packet having an Advertised Window Credit with the value set to zero.

9. The non-transitory computer-readable storage medium of claim 6, the data structure comprising a Stream Control Transmission Protocol (SCTP) selective acknowledgement (SACK) packet having an Advertised Window Credit with the value set to zero.

10. The non-transitory computer-readable storage medium of claim 6, comprising a plurality of instructions, that when executed, enable processing circuitry to migrate the virtual environment from the first host system to the second host system while maintaining a single session for the virtual environment and the peer system.

11. An apparatus, comprising:
memory;
processing circuitry coupled with the memory, at least a portion of at least one of the memory or processing circuitry comprised in hardware;
logic, at least partially implemented by the processing circuitry, the logic to:
receive an indication of a migration of a virtual environment and services from a first host system to a second host system;
in response to receiving the indication, initiate one or more processes for the virtual environment and services on the second host system;
receive information associated with the virtual environment and services;
halt communication of information for the virtual environment from a peer system to the first host system via sending a first data structure to the peer system;
generate a second data structure having a data structure value;
set the second data structure value equal to a value to cause the peer system to commence communication with the second host system;
commence communication of information for the virtual environment from the peer system to the second host system via sending the second data structure to the peer system; and
maintain a heartbeat between the first host system and the peer system during halting of the communication of information occurring during migration of the virtual environment and services.

12. The apparatus of claim 11, the second data structure comprising a Stream Control Transmission Protocol (SCTP) selective acknowledgement (SACK) packet comprising an Advertised Window Credit with the value set to a non-zero value.

13. The apparatus of claim 11, the second data structure comprising a Transmission Control Protocol (TCP) selective acknowledgement (SACK) packet comprising a Window Size with the value set to a non-zero value.

14. The apparatus of claim 11, the logic to migrate the virtual environment from the first host system to the second host system while maintaining a single session for the virtual environment and the peer system.

15. The apparatus of claim 14, the logic to perform a switch over of a link from the first host system to the second host system, the switch over to maintain the single session for the peer system and the virtual environment.

16. A non-transitory computer-readable storage medium comprising a plurality of instructions that, when executed by processing circuitry, enable processing circuitry to:
receive an indication of a migration of a virtual environment and services from a first host system to a second host system;
in response to receiving the indication, initiate one or more processes for the virtual environment and services on the second host system;
receive information associated with the virtual environment and services;
halt communication of information for the virtual environment from a peer system to the first host system via sending a first data structure to the peer system;
generate a second data structure having a data structure value;
set the data structure value equal to a value to cause the peer system to commence communication with the second host system;
commence communication of information for the virtual environment from the peer system to the second host system via sending the second data structure to the peer system; and
maintain a heartbeat between the first host system and the peer system during halting of the communication of information occurring during migration of the virtual environment and services.

17. The non-transitory computer-readable storage medium of claim 16, the second data structure comprising a Stream Control Transmission Protocol (SCTP) selective acknowledgement (SACK) packet comprising an Advertised Window Credit with the value set to a non-zero value.

18. The non-transitory computer-readable storage medium of claim 16, the second data structure comprising a Transmission Control Protocol (TCP) selective acknowledgement (SACK) packet comprising a Window Size with the value set to a non-zero value.

19. The non-transitory computer-readable storage medium of claim 16, comprising a plurality of instructions, that when executed, enable processing circuitry to migrate the virtual environment from the first host system to the second host system while maintaining a single session for the virtual environment and the peer system.

20. The non-transitory computer-readable storage medium of claim 19, comprising a plurality of instructions, that when executed, enable processing circuitry to perform a switch over of a link from the first host system to the second host system, the switch over to maintain the single session for the peer system and the virtual environment.

* * * * *